United States Patent Office 3,799,965
Patented Mar. 26, 1974

3,799,965
ALICYCLIC DIISOCYANATES
Kenneth D. MacKay, Circle Pines, and Edgar R. Rogier, Minnetonka, Minn., assignors to General Mills Chemicals, Inc.
No Drawing. Filed Aug. 21, 1972, Ser. No. 282,885
Int. Cl. C07c 119/04
U.S. Cl. 260—453 A                7 Claims

ABSTRACT OF THE DISCLOSURE

Diisocyanates of the formula

R'—Z—R"—NCO where R' is a monovalent straight chain aliphatic hydrocarbon radical containing 2 to 6 carbon atoms, R" is a divalent straight chain aliphatic hydrocarbon radical containing 7 to 11 carbon atoms, the sum of the carbon atoms in R' and R" is 13, and Z is a divalent radical of the structure

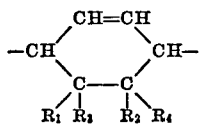

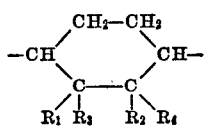

where $R_1$ and $R_2$ are H or $CH_3$ with the proviso that one of such radicals must be H and $R_3$ and $R_4$ are H or NCO with the proviso that one of such radicals must be H and the other must be NCO. Such diisocyanates find use in polymer and prepolymer preparations.

---

The present invention relates to novel diisocyanates and, more particularly, to new diisocyanates derived from certain diacid chlorides ultimately prepared from conjugated fatty acid compounds and certain dienophiles.

It was recently discovered that useful diisocyanates could be prepared through phosgenation of certain diamines ultimately prepared from conjugated fatty acid compounds and dienophiles. Such compounds are disclosed and claimed in U.S. Pat. 3,624,122. They find use in the preparation of polymers by reaction with organic compounds containing active hydrogens, such as polyols, polyacids, polyamines and the like.

We have now discovered a new class of diisocyanates which are derived from certain diacid chlorides ultimately prepared from conjugated fatty acid compounds and dienophiles. The new compounds of the present invention differ from those in the above-identified patent in that they have one primary and one secondary or tertiary isocyanato group whereas the patented compounds contain two primary isocyanato groups. Since the primary and secondary isocyanato groups have a predicted difference in reactivity, the new diisocyanates can be effectively used to prepare prepolymers.

Our new diisocyanates have the following general structural formula:

R'—Z—R"—NCO where R' is a monovalent straight chained aliphatic hydrocarbon radical containing 2 to 6 carbon atoms, R" is a divalent straight chained aliphatic hydrocarbon radical containing 7 to 11 carbon atoms, the sum of the carbon atoms in R' and R" is 13, and Z is a divalent radical of the structure

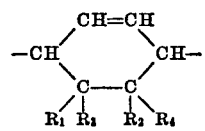

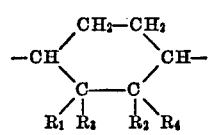

where $R_1$ and $R_2$ are H or $CH_3$ with the proviso that one of such radicals must be H and $R_3$ and $R_4$ are H or NCO with the proviso that one of such radicals must be H and the other must be NCO.

The new diisocyanates are prepared by the reaction of certain diacid chlorides with a metal azide with subsequent decomposition of the resulting diacyl azide to diisocyanate. The diacid chloride can be prepared by reaction of the corresponding diacids with phosphorus trichloride, oxalyl chloride, thionyl chloride and the like. The diacids in turn can preferably be prepared by forming an adduct of a conjugated fatty acid or ester thereof and an α,β-unsaturated acid or ester such as acrylic acid, methacrylic acid, crotonic acid and the $C_1$ to $C_8$ alkyl esters thereof. Where ester reactants are used to form the adducts, the resulting products are hydrolyzed to yield the diacids useful in preparing the starting diacid chlorides.

The conjugated fatty acids used in the preparation of the diacids are those having two or more ethylenic bonds in the hydrocarbon chain, at least two of such ethylenic bonds being in conjugal relationship. Fatty acids containing 18 carbon atoms and two or more ethylenic bonds are commonly found or derived from semi-drying and drying oils such as soy bean oil, tall oil, tung oil, linseed oil and the like. Specific illustrative 18 carbon atom acids are 9,12-octadecadienoic acid, 9,11-octadecadienoic acid, 10,12-octadecadienoic acid, 9,12,15-octadecadienoic acid (linolenic acid), 6,9,12-octadecatrienoic acid, 9,11,13-octadecatrienoic acid (α-eleostearic acid), 10,12,14-octadecatrienoic acid (pseudo-eleostearic acid) and the like. The $C_1$ to $C_8$ alkyl esters of the fatty acids can be used. Where the fatty acid or derivative is unconjugated, conjugation of the double bonds can be effected by conventional techniques. Thus, for example, the acids and esters can be conjugated using well known alkali conjugation techniques.

As indicated, the diacyl chlorides can be reacted with metal azides using conventional techniques to yield the diacyl azides which are decomposed by heat to the new diisocyanates. One preferred method of carrying out this preparation is through the use of two essentially immiscible phases and quaternary ammonium salts. Thus the diacid chloride is dissolved in an essentially water immiscible organic solvent and is then contacted with an aqueous solution of a metal azide such as sodium azide. The quaternary ammonium salt aids in the transfer of the azide ions to the organic phase thereby yielding metal chloride and diacyl azide. The latter is then decomposed by heating to the new diisocyanates.

The preparation of the new diisocyanates of the invention is further illustrated by the following examples. Said examples are to be considered as illustrative of certain preferred embodiments of the invention and are not to be considered as limiting.

EXAMPLE I

A mixture of 93.6 g. (0.32 equiv.) of methyl-α-eleostearate, 27.2 g. (0.32 equiv.) of methacrylic acid, and 0.25 g. of hydroquinone was heated at 120° C. for 16 hours under nitrogen. After cooling to 25° C., the reaction mixture was added to 40 g. of potassium hydroxide in 150 ml. of water and the mixture was heated to reflux for 1½ hours. Two hundred milliliter of distillate was then collected to remove the methanol. During distillation, water was replenished to the system at about the same rate as vapor was condensed. Cyclohexane (500 ml.) was added at once and the temperature of the system was adjusted to 70° C. Enough dilute hydrochloric acid then was added to bring the pH of the mixture to about 2. However, the precipitated product did not dissolve in the cyclohexane and was only slightly soluble in the chloroform. Thus, after separation of the water phase, the volatiles were removed under vacuum leaving 100.9 g. of crude diacid for a yield of 86%.

To 30.1 g. (0.17 equiv.) of the diacid as above prepared slurried in 100 ml. of dry benzene was added 52.4 g. (0.41 equiv.) of oxalyl chloride over a period of about 30 minutes. Gas evolution began immediately, but no significant exotherm occurred. After the addition was complete, the mixture continued to evolve gas slowly and was allowed to stir overnight. The mixture then was filtered and the filtrate was stripped of volatiles under reduced pressure leaving 24.0 g. (0.12 equiv.) of diacid chloride for a yield of 72.5%.

To 1.5 g. (0.023 mole) of sodium azide and 0.25 g. of methyl trifatty ammonium chloride (Aliquat®336 S which has an average of 28 carbon atoms and wherein the fatty groups were derived from the shorter chain acids of coconut oil and contain 8–10 carbon atoms each) in 10 ml. of water at 5° C., was slowly added with vigorous stirring a solution of 4.0 g. (0.019 equiv.) of the diacid chloride as above prepared in 20 ml. of cyclohexane. The time of addition was about ten minutes and stirring was continued for an additional five minutes. The mixture was then placed in a separatory funnel and the aqueous layer was removed. The organic phase was washed twice with 25 ml. portions of 50% acetontrile by volume in water and once with water. It was then dried over magnesium sulfate at about 10° C. The magnesium sulfate was removed by filtration and the filtrate was heated at 70° C. until all gas evolution ceased. The cyclohexane was distilled off under reduced pressure at 60° C. There was obtained 3.0 g. of diisocyanate for a yield of 84%. The diisocyanate consisted essentially of a mixture of unisolated isomers of the structural formulae:

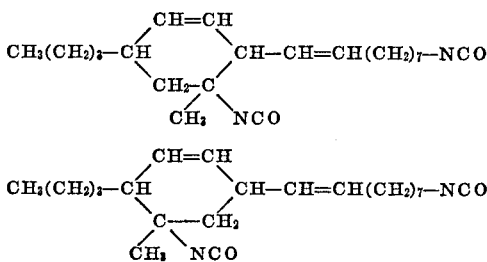

EXAMPLE II

A. Dimethyl ester preparation

A ten gallon stainless steel reactor was charged with 4988 g. (17.1 equiv.) of tung oil, 3000 g. (34.9 equiv.) of methyl acrylate and 30 g. of hydroquinone. The reactor was stirred and heated for 17 hours with high pressure steam. The initial pressure of the system was 50 p.s.i., but dropped to 15 p.s.i. at the end of the heating period. After cooling to 25° C., 421 g. of methyl acrylate was obtained from the overhead condenser of the reactor. Additional excess methyl acrylate (742 g.) was stripped off at 35° C. (35 mm, Hg.).

To the product as above prepared was added at once 2160 g. (67.5 equiv.) of methanol and 75 g. (1.3 equiv.) of potassium hydroxide. After closing of the reactor, the mixture was agitated for 45 minutes during which time the temperature rose to 50° C. Heat was then applied and the temperature maintained at 75° C. (24 p.s.i.) for one hour. The system was cooled to 25° C., two gallons of dry benzene were added, the mixture was agitated for 5 minutes and then allowed to stand for 45 minutes. After standing, the lower glycerine layer was drawn off and a solution of 300 g. of 85% phosphoric acid in ten liters of water was stirred in over a five minute period. Fifteen minutes were allowed for the mixture to separate, the lower aqueous phase was removed and the acidic wash and separation were repeated. Finally, the volatiles were removed at 50° C. (20 mm. Hg.) leaving 6061 g. (16.7 equiv., 97.8% yield) of crude dimethyl ester product. The crude product was then distilled in a five plate two-inch Oldershaw fractionation column to remove a first and second fraction (15% and 3.6% respectively) which fractions constituted mainly monoesters. The residue was passed through a two-inch wiped film still at an exterior wall temperature of 230° C., a pressure of 75μ and a feed rate of 17.5 ml./min. The resulting distillate was found to be 100% dimethyl esters of the adduct of acrylic acid and α-eleostearic acid.

B. Diacid chloride preparation

To a solution of 50 g. (0.75 mole) of potassium hydroxide in 250 ml. of water was added 116 g. (0.61 equiv.) of the distilled diesters of A. with vigorous stirring. This mixture was heated at reflux for about 30 minutes at which time it became homogeneous. At this point a Dean-Stark trap was attached to the condenser and samples of the refluxing solvent were collected. Water was periodically added to the mixture in order to approximately maintain the initial solution volume. After about 200 ml. of distillate was collected, the concentration of methanol in the distillate was negligible (less than 20 p.p.m.). The temperature of the solution was reduced to 70° C. and 550 ml. of cyclohexane was added at once. Then a 15% aqueous hydrochloric acid solution was added with vigorous stirring until the pH of the aqueous phase was 3 or less. At first a white flocculent precipitate formed which upon continued stirring for about 5 minutes dissolved in the cyclohexane layer at 70° C. The lower aqueous layer was removed and the organic layer was dried by attaching a Dean-Stark trap to the condenser and azeotropically distilling the water from the cyclohexane at reflux.

The cyclohexane solution of the diacid as above prepared was cooled to about 50° C. and 80 g. (0.58 mole) of phosphorus trichloride was added at once. This mixture was then heated at 55° C. for three hours. During the heating a white precipitate formed which was removed by centrifugation after the mixture was cooled to ambient temperature. The supernatant then was decanted and stripped of volatiles under reduced pressure at 40° C. The diacid chloride weighed 107.1 g. (91% yield).

C. Diisocyanate preparation

A mixture of 37 g. (0.57 mole) of sodium azide, 2 ml. of 12 N hydrochloric acid and 7 g. (0.015 mole) methyl trifatty ammonium chloride as used in Example I in 300 ml. of water was cooled to 0° C. in an ice/salt bath. A precooled solution of 100 g. (0.52 equiv.) of the diacid chloride of B in 500 ml. of n-heptane was added with agitation over a 60 minute period at such a rate that the temperature did not rise above 7° C. Stirring was continued for five minutes after the addition was complete. The mixture then was placed in a separatory funnel and the aqueous layer was removed. The organic phase was washed twice with 500 ml. portions of 50% acetonitrile in water and once with water. It was then dried over magnesium sulfate at about 10° C., the magnesium sulfate was removed by filtration and the filtrate was added to 500 ml. of n-heptane at 70° C. Nitrogen was evolved at a vigorous rate during the addition which took about 90 minutes. After the addition was complete, the solvent was removed under reduced pressure at 60° C. The residue weighed 82.3 g. for a yield of 92.3%. Infrared analysis indicated 98.5% purity and a di-n-butyl amine titration gave 23.6% NCO (theory=24.4%). The diisocyanate was conveniently distilled in a straight pot distillation, B.P. 208–210° C. (0.5 mm. Hg.). Infrared analysis of the distillate showed no impurities and di-n-butyl amine titration gave a percent NCO of 24.2. The diisocyanate had the same structure as that of Example I except the ring contained no —CH$_3$ group (replaced by H).

EXAMPLE III

Example II, Parts B and C were essentially repeated except that the dimethyl ester was first hydrogenated as follows: A solution of 53.0 g. of the dimethyl ester as prepared in Part A of Example II in 82.5 g. of 95% ethanol was added to 1.0 g. of 5% palladium on carbon in a thick walled bottle. The bottle was placed on a Parr hydrogenation apparatus, flushed of oxygen by successive evacuation and charging of the bottle with nitrogen, and finally filled with hydrogen to a pressure of about 40 p.s.i. The mixture was then shaken at room temperature until no further uptake of hydrogen was observed (about 20 hours). The shaker then was stopped and the hydrogen was flushed from the bottle. The catalyst was removed by filtration and the solvent evaporated under reduced pressure leaving 52.8 g. (99% yield of saturated diester—iodine value=1.3).

The diisocyanate had the same structure as that of Example II except that the ring and aliphatic chain contained no double bonds.

Our new diisocyanates are useful as monomers in polymerizations. As indicated previously, the new diisocyanates have two different isocyanato groups in the same molecule. Specifically, one is a primary isocyanato group and the other is either secondary or tertiary. As predicted, these two groups have differences in reactivity, and like toluene diisocyanate, which also has groups of differing reactivity, find particular use in prepolymer preparations. A relatively large difference in reactivity is necessary in order to insure that few unreacted diisocyanate molecules remain and that the prepolymer has a relatively narrow molecular weight distribution. The prepolymers find use in the preparation of polymers by reaction with active hydrogen containing compounds. The following example illustrates prepolymer preparation using the new diisocyanates.

EXAMPLE IV

Mixtures of equivalent ratios of 1.0:1.8 of trimerol (a triol of the formula R—(CH$_2$OH)$_3$ wherein R is the trimeric hydrocarbon group of a trimerized fat acid prepared by polymerizing the mixture of fat acids obtained from tall oil, said mixture consisting mainly of linoleic and oleic acids) to the diisocyanates of Examples II and III were heated at 64° C. until no hydroxyl remained. Both of the prepolymers remained somewhat mobile and had Gardner viscosities of G and H, respectively, at 60% solids in a strong urethane solvent (1 part butyl acetate, 1 part toluene, 3 parts methyl ethyl ketone, and 3 parts Cellosolve acetate). In comparison, a diisocyanate as prepared in Example I of U.S. Pat. 3,624,122 reacted under identical conditions and ratios with the trimerol gelled and the polyurethane was insoluble in either chloroform or the strong urethane solvent. The fact that this prepolymer gelled and became insoluble was no doubt due to crosslinking with the trimerol. Such crosslinking was minimized in the case of the diisocyanates of the invention which contained isocyanato groups having differential reactivities.

In addition to prepolymer preparations, the new diisocyanates may also be reacted with a variety of active hydrogen containing compounds to provide finished polymers directly. Reaction with polyols yields polyurethanes. Examples of such polyols are ethylene glycol, 1,2-propanediol, 1,3-propanediol, 1,4-butanediol, 1,6-hexanediol, 1,4 - dimethylol-cyclohexane, 4,4'-dihydroxydiphenyl-2,2-propane, and the like. Reaction with polyamines yields polyureas. Examples of polyamines are ethylene diamine, diethylene triamine, hexamethylene diamine, p-phenylene diamine, 1,4-diaminocyclohexane, and the like. Reaction with polyacids yields polyamides. Representative acids are adipic acid, sebacic acid, phthalic acid, trimesic acid and the like. The following examples illustrate polymer preparations.

EXAMPLE V

To a mixture of 9.81 g. of diisocyanate as prepared in Example III and 2.39 g. of 1,4-butanediol was added one drop of dibutyl tin dilaurate catalyst. The cloudy mixture was slowly heated with stirring to 60° C. at which point the mixture became clear. After an additional five minutes, the mixture became viscous and was poured onto a Teflon sheet and heated at 60° C. in a vacuum-drying oven under reduced pressure. The polyurethane thus obtained weighed 10.95 g. and had a melting point of 65° C. and an inherent viscosity of 0.301 (0.5 g./100 ml. o-chlorophenol).

EXAMPLE VI

Example V was essentially repeated except using 5.99 g. of diisocyanate as prepared in Example II and 1.39 g. of 1,4 - butanediol. The resulting polyurethane weighed 6.84 g., had a melting point of 65° C. and an inherent viscosity of 0.309.

The embodiments of the invention in which an exclusive property or privilege is claimed are defined as follows:

1. A diisocyanate of the formula

where R' is a monovalent straight chain aliphatic hydrocarbon radical containing 2 to 6 carbon atoms, R" is a divalent straight chain aliphatic hydrocarbon radical containing 7 to 11 carbon atoms, the sum of the carbon atoms in R' and R" is 13, and Z is a divalent radical of the structure

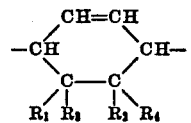

or

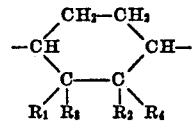

where R$_1$ and R$_2$ are H or CH$_3$ with the proviso that one of such radicals must be H and R$_3$ and R$_4$ are H or NCO with the proviso that one of such radicals must be H and the other must be NCO.

2. A diisocyanate according to claim 1 wherein Z is

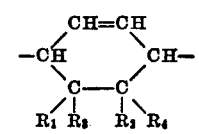

3. A diisocyanate according to claim 2 wherein R' is CH$_3$(CH$_2$)$_3$— and R" is —CH=CH(CH$_2$)$_7$—.

4. A diisocyanate according to claim 3 wherein $R_1$ and $R_3$ are H and $R_2$ is $CH_3$.

5. A diisocyanate according to claim 3 wherein $R_1$, $R_2$ and $R_3$ are H.

6. A diisocyanate according to claim 1 wherein Z is

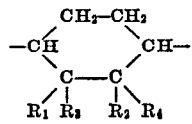

7. A diisocyanate according to claim 6 wherein $R_1$, $R_2$ and $R_3$ are H.

References Cited
UNITED STATES PATENTS
3,624,122   11/1971   Namal et al. _____ 260—453

LEWIS GOTTS, Primary Examiner
D. H. TORRENCE, Assistant Examiner

U.S. Cl. X.R.
260—77.5 AT, 349, 408, 410.9, 413, 453 P